United States Patent [19]

Auge

[11] 4,050,785
[45] Sept. 27, 1977

[54] SPECTACLE FRAMES

[76] Inventor: Bernard Auge, 7, rue Poncelet, 75017 Paris, France

[21] Appl. No.: 551,550

[22] Filed: Feb. 21, 1975

[30] Foreign Application Priority Data

Feb. 27, 1974 France .............................. 74.06618

[51] Int. Cl.² .......................... G02C 5/14; G02C 5/22
[52] U.S. Cl. .................................. 351/120; 16/128A; 351/121; 351/153
[58] Field of Search ............... 351/114, 120, 121, 124, 351/153, 119; 16/128 A; 351/113

[56] References Cited

U.S. PATENT DOCUMENTS

| 1,842,377 | 1/1932 | Gagnon | 351/120 |
| 3,152,716 | 10/1964 | Feldhahn | 351/153 X |
| 3,476,466 | 11/1969 | Hopkins | 351/153 X |
| 3,516,737 | 6/1970 | Banfi et al. | 351/114 |
| 3,586,425 | 6/1971 | Gilman | 351/113 |
| 3,883,236 | 5/1975 | Zipper | 351/112 |

FOREIGN PATENT DOCUMENTS

| 1,195,993 | 11/1959 | France | |
| 312,398 | 11/1933 | Italy | 351/121 |
| 232,161 | 5/1944 | Switzerland | 351/120 |
| 402,449 | 11/1965 | Switzerland | 351/120 |

Primary Examiner—Paul A. Sacher
Attorney, Agent, or Firm—Brisebois & Kruger

[57] ABSTRACT

Spectacle frames comprise substantially flat front part holding the lenses, hinges lying between the front and rear surfaces of the front part and connecting to thin flexible metal temples terminating in thickened ear pieces. Means are provided for holding the temples flat against the front part of the spectacles when they are in folded position.

8 Claims, 11 Drawing Figures

SPECTACLE FRAMES

SUMMARY OF THE INVENTION

One of the disadvantages of spectacles for persons who are not required to wear them constantly is the space taken up by a pair of glasses when folded up and retained in a place readily accessible to the user. In particular, when the spectacles are put in a clothing pocket, it is disagreeable to cause a deformation of the clothing due to the bulk of the spectacles in their folded position.

It is the purpose of the present invention to diminish the above disadvantage by providing an especially flat frame for spectacles when the spectacles are in a folded position. This makes it possible to decrease to a minimum the space occupied in the pockets of the user.

It is accordingly the object of the present invention to provide a new article of manufacture which consists of a spectacle frame comprising a substantially flat front part in which the two lenses of the spectacles are located and two temples which are pivotally connected to the front part by means of two hinges positioned at opposite sides thereof.

On each side of the front part, the eye of the hinge is located between the planes containing the front and rear surfaces of the front part. The main part of each temple is thin, but carries an end of sufficient thickness to avoid injury to the ears of the user. The temples may be located in their folded position in the immediate vicinity of the front part of the spectacles due to the fact that each hinge consists of a plate connected to the front part, which plate carries an eye, the axis of which defines an acute angle with the plane of symmetry of the frame, which angle is open towards the top.

In an advantageous embodiment the means for locating the temples of the spectacles in the vicinity of the plane of the central zone of the front part of the spectacles include means for holding the thin parts of the temples against the central zone of the front part of the spectacles.

These means may be mechanical or magnetic means attached to the frame of the lenses. Alternatively, these means may be mechanical means external to the frame such as a clamp connected to the center of the spectacles to simultaneously grip the temples and the front of the spectacles, or a sheath provided with a hinge spring and capable of compressing the temples to bring them against the front part of the frame. Means may, for example, be provided for holding the temples of the spectacles against the central part of the front of the frame which comprises a draw spring for each temple positioned in the zone of the hinge, said spring urging the temple against the front part of the frame.

Alternatively, the means for holding the main part of the temples of the spectacles against the front part of the frames consists of recessed zones formed in the main parts of the temples. The main parts of the temples are made of sheet steel and can invert their curvature at the recessed zones in response to external force.

In still another case the means for holding the temples are magnetic, said temples being made of a magnetic material while a strong permanent magnet is positioned inside the center of the front part of the spectacles, near the surface of said front part which is intended to lie against the face of the user.

In yet another case, the means for holding the temples are mechanical and comprise snap means for holding the two superposed temples together.

In an advantageous embodiment of the last-mentioned arrangement, the two temples are fastened together by snap fasteners carried by the rear surface of the front part of the glasses, said fasteners being biassed by at least one draw spring.

In this case, the snap means for holding the temples comprises a base seated within the front part of the spectacles, said base supporting two sliding pins which are movable with respect to each other, springs being positioned around the two pins and tending to separate from the base a movable clamp mounted thereon and fixed to the said slidable pins. This clamp defines part of the rear surface of the front part of the spectacles and carries two hooks which project from the lower wall of said front. The plate of the hinge defines part of the front or back surface of the front part of the frame, and is preferably recessed into the front part of the spectacles.

The end of each temple of the spectacles is substantially straight but staggered from the main part of the temple in a direction parallel to the axis of the corresponding eye by a distance substantially equal to the width of the temples in the pivotal zone. Each temple is a flexible metallic strip preferably slightly curved to allow for the shape of the head of the user. Each hinge comprises an abutment against which the end of the temple bears when the temples are in open position. One of the temples carries a hook on its outer surface, by means of which the folded frame may be attached to a flat member, such as the edge of a pocket.

It is clear that the frame for the spectacles according to the invention takes up very little space when the temples of the spectacles are folded against the rear surface of the front part of the frame.

In effect, the temples of the preferred embodiment may then bear against this rear surface because of the simultaneous presence of three characteristics:

The eye of the hinge lies between the planes containing the front and back surfaces of the front part;

The temples are flexible and can be bent against the front part;

The end of each temple is spaced from the hinge of the other temple when the temples are folded, and the axis of the eyes of the hinges are inclined with respect to the plane of symmetry of the spectacles so that the two temples fold one on top of the other.

The temples are held against the rear surface of the front part of the frame by retaining means which are carried by the front part, for example, snap fastening means, e.g., snap hooks which grip the superposed temples.

It is important to note that the plate of the hinge may be located on either surface of the front part of the spectacles, or even between said surfaces, provided that the eye of the hinge is located between the corresponding planes of the front and back surfaces of the front part of the spectacles. When used in this specification and in the claims the term "rear surface of the front part of the spectacles" means the surface of this part adjacent the face of the user who wears the glasses, the front surface being the opposite surface.

The preferred embodiment is one in which the plate of the hinge is recessed into the rear surface of the front part.

In order that the object of the invention may be better understood several representative embodiments will now be described, purely by way of illustration and example, with reference to the accompanying drawings, in which:

FIG. 5 is a perspective view of the hinge of the spectacles of FIG. 1;

FIG. 6 is a perspective view showing in detail one part of the hinge of the spectacles of FIG. 1, with the temples of said spectacles removed;

FIG. 7 is a sectional view taken along the line VII—VII of FIG. 2, the two temples of the spectacles being folded;

Figure 1:
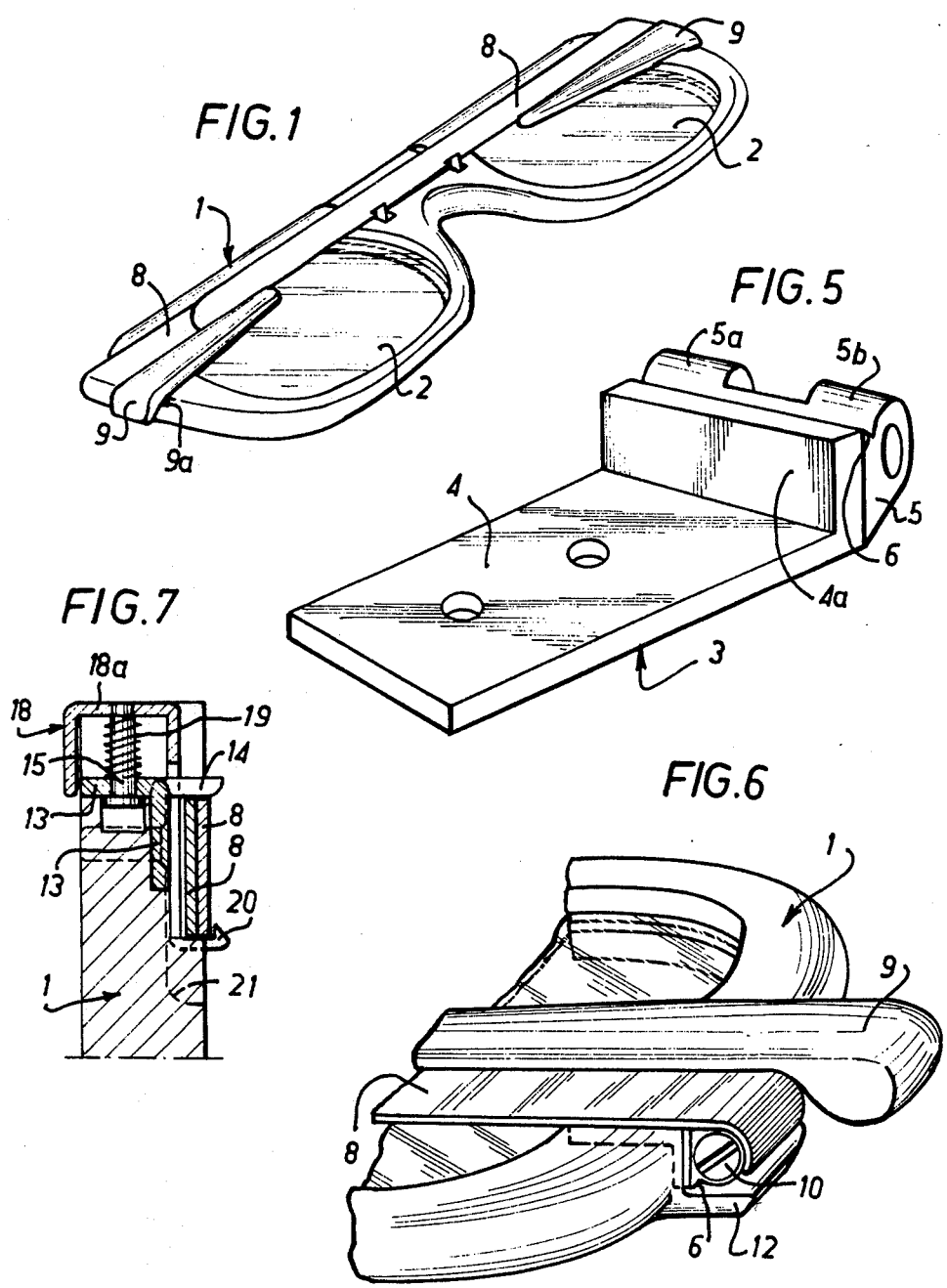
FIG. 1 is a perspective view showing a pair of spectacles according to the invention, with the temples in folded position.
Figure 2:
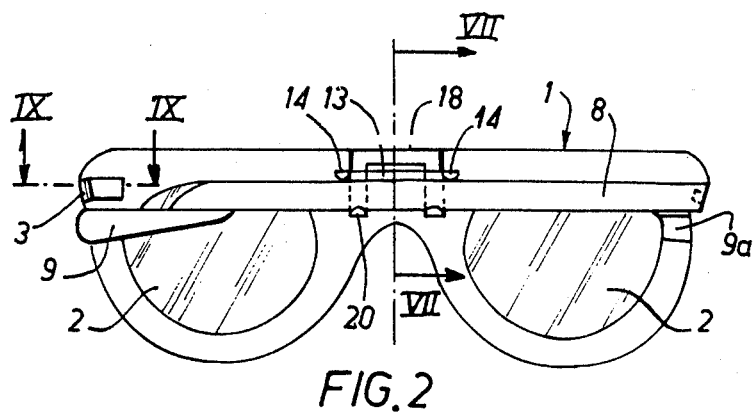
FIG. 2 is an elevational view of the spectacles of FIG. 1, with one of the temples removed.

Referring now to the drawings, it will be seen that reference numeral 1 indicates the front part of the spectacles according to the invention, considered as a whole. The front part 1 carries two lenses 2. On each side of the front part 1 is positioned a hinge 3 consisting of a plate 4 and an eye 5. The eye 5 is a female part of the pivot and comprises two identical members 5a and 5b between which is inserted the male eye of the temple which is pivotally attached to the hinge in question. The eye 5 is positioned on a flange 4a of the plate 4, and the outer cylindrical surfaces of the members 5a and 5b are connected to the flange 4a by means of a strip 6. The axis of the eye 5 is at an angle of 10° with respect to the axis of symmetry of the front part 1, (along which section VII—VII, FIG. 2, is taken) and extends upwardly away therefrom.

Figure 9:
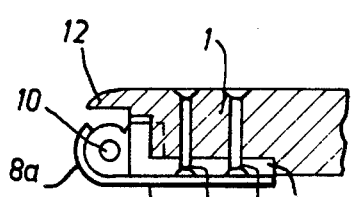
FIG. 9 is a sectional view taken along the line IX—IX of FIG. 2.

Reference numeral 7 indicates each temple of the spectacles in its entirety. The temple 7 consists of a main part 8 formed from a strip of steel plate and an end 9 which is downwardly displaced with respect to said strip and fixed to the main part 8. The main part 8 is slightly curved in order to allow for the shape of the head of the user. The main part 8 is also curved in the zone 8a of its articulation on the hinge 3, as is shown in FIG. 9, and this curved zone carries the male member of the eye, which must be positioned between the two members 5a, 5b. A pin 10 holds the male and female parts of the eye together. This pin is screwed into the member 5a of the eye in a known manner.

The plate 4 of the hinge 3 is seated in the rear wall of the front part 1 and attached to the front part 1 by two rivets 11. The flange 4a is inset into the front part 1 and the entire hinge 5 lies between the planes containing the front and rear surfaces of the front part 1.

The hinge is hidden from the front of the spectacles in a recess 12 in the front part 1. The eye which is attached to each temple 8 makes an angle of 10° with that temple so that the temples of the spectacles are inclined 10° downwardly when the front part 1 of the glasses is vertical and when these temples are in unfolded position, as shown in FIG. 3.

Figure 8:
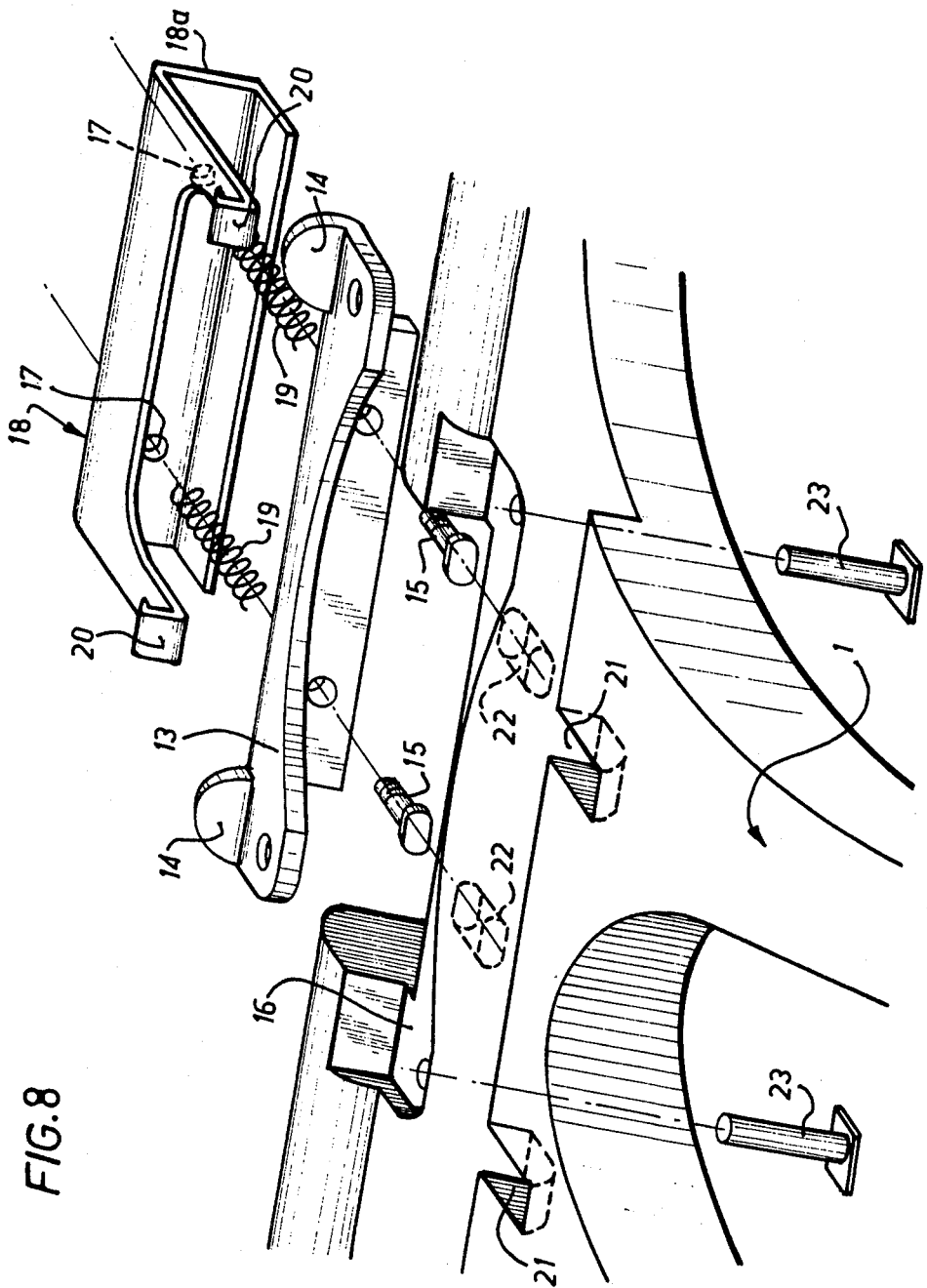
FIG. 8 is a perspective exploded view showing the clamping means holding the temples of the spectacles.

In the middle of the front part 1, that is to say in the bridge between the two lenses of the spectacles, snap fastening means are provided which are shown in detail on FIGS. 7 and 8. This mechanism consists of a base 13 provided with two end bosses 14, said base being pierced by two pins 15. The base 13 is an angle member, with the web of the angle member which is pierced by the pins 15 inset into the top of the front part 1 whereas the other web is inset into the rear surface of the front part 1, its seat being indicated by 16 on the drawings. The pins 15 are screwed into bores 17 in the center 18a of the channel member 18, the two sides of which embrace the base. The bottom 18a of the channel member is parallel to the web of the corner member 13 which is pierced by the pins 15. Around the pins 15 between the base 13 and the bottom 18a of the channel member 18 are springs 19. The side of the channel member 18 which is adjacent the rear surface of the front part 1 carries two snap hooks 20 each of which moves in a groove 21 formed in the rear surface of the front part 1. The hooks 20 project from the rear surface of the front part. Within the front part 1 are two seats 22 which open into the seat 16 and are located in alignment with the heads of the pins 15 so as to permit the displacement of these pins inside the seats 22.

The snap means is mounted by fastening the base 13 to the channel member 18 by means of slidable pins 15, while interposing between the base and the channel member springs 19 threaded onto pins 15. The pins 15 are screwed into threaded bores 17. When this has been done the base 13 is positioned in the seat 16 formed for this purpose by inserting the heads of the pins 15 into the seats 22, with the hooks 20 positioned inside the recesses 21. The base 13 is then attached to the front part 1 by means of the two rivets 23 which pass through the front part 1 in alignment with the seat 16 and also pierce the web of the base 13 which is parallel to the rear surface of the front part 1. When the device is mounted in this way the channel member 18 is biassed upwardly by the springs 19 and the hooks 20 are thus maintained in their upper position.

Figure 3:
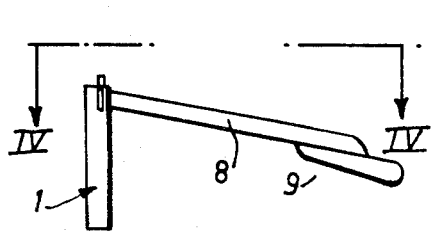
FIG. 3 is a side view of the spectacles of FIGS. 1 and 2, with the temples in open position.
Figure 4:
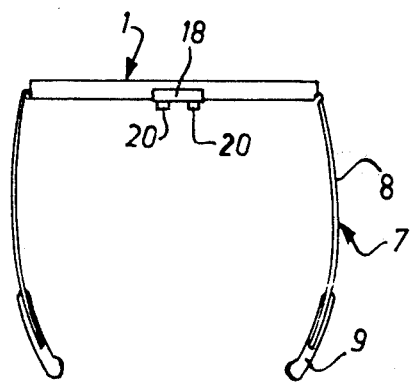
FIG. 4 is a top view taken from line IV—IV of FIG. 3.

When the temples of the spectacles are folded in, the temples 8, 9 which are in the position illustrated in FIG. 3 become parallel to the upper edge of the front part 1. The two main parts of the two temples are then superposed since the two hinges 3 are positioned at the same height. In order to obtain flat superposition it is necessary for the user to press on the metallic strips constituting the temples 8 so as to eliminate the curvature of these temples. When the curvature is eliminated by pressure from the fingers of the user, the two temples 8 bear against each other and the rear surface of the front part 1. This arrangement is made possible by the fact that the ends 9 of the temples are displaced downwardly with respect to the main parts of the temples 8 so that the ends each come into position below the hinge 3 corresponding to the other temple, with each of the ends being received in a seat 9a formed in the rear surface of the front part of the spectacles. When the user has brought the temples together in this way against the rear surface of the front part 1, the metallic members press against the hooks 20 and, because of the shape of these hooks, this pressure is transformed into a force parallel to the pins 15 exerted on the channel member 18. The temples 8 are guided during this phase of the operation by the two abutments 14. The channel member 18 then approaches the base 13 due to compression of the springs 19 so as to permit the hooks 20 to move downwardly out of the way to permit the abutment of the temples 8 against the rear wall of the front part 1, and once this abutment has been brought about the hooks 20, in response to the force exerted by the springs 19, rise again to grip the lower edges of the temples 8 and hold these temples in abutment against the rear surface of the front member 1.

When the user wants to open the temples of the spectacles, he presses with a finger on the channel member 18. This pressure forces the hooks 20 down and releases the temples 8, which regain their curved shape due to the elasticity of the metal.

It will be seen that the spectacle frame according to the invention occupies a minimum space when in the folded position, since the flat temples are pressed against the rear surface of the front member 1.

Figure 10:
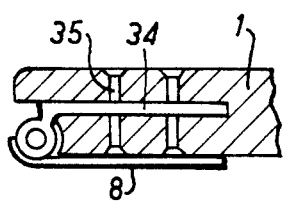
FIG. 10 is a sectional view of another embodiment of the mounting for the hinge of the spectacles of FIGS. 1-9, taken along a line analogous to that of FIG. 9.

FIG. 10 shows another embodiment of the connection between the hinge and the front part of the spectacle frame. In this embodiment the hinge comprises a plate 34 which is set into the front part 1. This is attached by rivets 35 which pass through the front part 1 and the plate 34. The eye of this hinge lies between the planes containing the front and rear surfaces of the front part 1.

Figure 11:
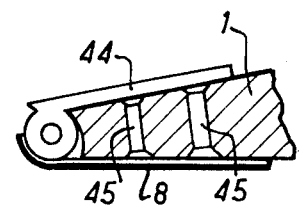
FIG. 11 is a sectional view of yet another embodiment of the mounting for the hinge of the spectacles of FIGS. 1-9, taken along a line analogous to that of FIG. 9.

FIG. 11 shows a second embodiment in which the hinge comprises a plate 44 overlying a bevelled edge on the front surface of the front member 1, the plate 44 being connected to the front member 1 by rivets 45. The eye of this hinge lies between the planes containing the front and rear surfaces of the front member 1.

It will be appreciated that the embodiment which has just been described has been given purely by way of illustration and example and may be modified as to detail without thereby departing from the basic principles of the invention.

In particular, the means for holding the temples of the spectacles against the rear wall of the front part 1 may be other than the snap means hereinbefore described. They may comprise a magnet holding the temples 8 against the front part of the spectacles, or they may comprise snap-fastening buttons, one member of which is fixed to the rear surface of the front of the spectacles and the other member of which is attached to the temples 8. Moreover, the frame according to the invention may be made of any suitable material, including both a plastic material imitating shell, and a metal.

What is claimed is:

1. In a frame for spectacles comprising a substantially flat front part in which two lenses are mounted, and two temples pivotally connected to said front part by means of hinges located at opposite sides of the front part, said hinges lying between the planes containing the front and rear surfaces of the front part of the spectacles, said temples having a main part made of a thin material terminating in thicker free ends, and means for holding the thin parts of the temples against the rear surface of the front part of the spectacles when in folded position, the improvement according to which each hinge has a pivotal axis at a fixed acute angle to the axis of symmetry of said spectacles, with the upper end of said pivotal axis further from said axis of symmetry than its lower end, and the end of each temple is offset with respect to the rest of the temple in a direction parallel to the axis of the corresponding hinge by a distance substantially equal to the width of the main part of the temple adjacent said hinge.

2. Spectacle frame as claimed in claim 1 in which the means for holding the temples against the front part of the spectacles are carried on the central portion of the front part of the spectacles and hold the thin parts of the temples thereagainst.

3. Spectacle frame as claimed in claim 2 in which the means for holding the thin part of the temples against the front part of the frame comprise curved zones formed in the thin parts of the temples, said thin parts being made of steel strips adapted to reverse their curvature under external pressure.

4. Spectacle mounting as claimed in claim 2 in which the means for holding the temples comprise snap-fastening hooks carried by the rear surface of the front part of the spectacle, said hooks being biassed by at least one spring.

5. Spectacle mounting as claimed in claim 4 in which the snap-fastening means comprises a base seated in the front part of the frame, said base being pierced by two slidable pins which are movable with respect to said base, springs encircling said pins, and a movable channel mounted on said pins and biassed away from said base by springs, said channel member defining part of the rear surface of the front part of the frame and carrying two hooks projecting away from the rear surface of said front part.

6. Spectacle frame as claimed in claim 1 in which each hinge comprises a plate forming part of one of the principal surfaces of the front part of the frame and lying between the planes containing the front and rear surfaces of the front part of the frame.

7. Spectacle frame as claimed in claim 1 in which the thin part of the temple is a flexible metallic strip which is slightly curved to allow for the shape of the head of the user.

8. Spectacle frame as claimed in claim 1 in which each hinge has an abutment constituted by a plate against which the end of the temple bears when the temples are in open position.

* * * * *